United States Patent
Edlund et al.

(10) Patent No.: US 7,302,643 B1
(45) Date of Patent: Nov. 27, 2007

(54) SYSTEM AND METHOD FOR SCHEDULED EVENTS TO SUBSCRIBE TO LIVE INFORMATION TOPICS

(75) Inventors: Stefan B. Edlund, Sunnyvale, CA (US); Daniel Alexander Ford, Los Gatos, CA (US); Joann Ruvolo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 09/531,016

(22) Filed: Mar. 20, 2000

(51) Int. Cl.
*G06F 3/00* (2006.01)
(52) U.S. Cl. ................. 715/703; 715/963
(58) Field of Classification Search ........ 345/963, 345/751, 853, 962; 705/8, 9; 715/703, 962, 715/963, 751
See application file for complete search history.

(56) References Cited

U.S. PATENT DOCUMENTS 5,855,006 A * 12/1998 Huemoeller et al. .......... 705/9
6,065,012 A * 5/2000 Balsara et al. ............ 345/839
6,369,840 B1 * 4/2002 Barnett et al. ............ 345/751

* cited by examiner

*Primary Examiner*—Kristine Kincaid
*Assistant Examiner*—Thanh Vu
(74) *Attorney, Agent, or Firm*—IP Authority, LLC.; Ramraj Soundararajan

(57) ABSTRACT

A calendar system stores and organizes materials related to scheduled events, to-dos, addresses, etc. and allows a user to browse a calendar and select entries for viewing. In addition, each entry is linked to any number of topics related to that entry and up-to-date information on these topics are displayed when the entry is viewed. Topics are published on topic channels by one or more topic providers and a calendar system administrator defines which topics relate to which calendar entries. When a client enters information related to a new calendar entry or event, the calendar system determines which topics relate to that event and identifies corresponding topic channels which currently exist or need to be created between the calendar system and the topic providers. Finally, in each calendar entry, links are created to local versions of the appropriate topic channels and the entry is then persistently stored. Multiple calendar events and multiple calendar users are able to link to the same local topic channel and thereby reduce data searching, retrieval, and storage costs.

19 Claims, 3 Drawing Sheets

SYSTEM AND METHOD FOR SCHEDULED EVENTS TO SUBSCRIBE TO LIVE INFORMATION TOPICS

BACKGROUND OF THE INVENTION

1. Field of Invention

The present invention relates generally to the field of electronic calendar systems. More specifically, the present invention is related to accessing dynamic content linked to different calendar events.

2. Discussion of Prior Art

In traditional electronic scheduling or calendaring systems, entries are static. They are entered by a calendar user as a reminder for a future event and, perhaps, an accompanying alarm is set as well. Recently, it has been recognized that it would be useful for a calendar system to automatically retrieve additional information related to the scheduled events or entries. Examples of additional information that can be automatically collected and tied to a calendar entries include information about meeting participants, flight itineraries, driving instructions, and weather forecasts. While this general concept has previously been identified, the prior art fails to provide details regarding how to implement the capability of linking calendar events and related dynamic information. The following two patents provide an introduction to electronic calendaring systems and locating additional information relevant to a calendar entry.

The patent to Borovoy et al. (U.S. Pat. No. 5,842,009) provides for a system which automatically retrieves documents relevant to a user's calendar event. This reference focuses on determining when to retrieve information and how to determine what information might be most relevant.

The patent to Rasansky et al. (U.S. Pat. No. 5,960,406) provides for a computerized calendar and scheduling system which allows access to web-based clients. However, no teaching of dynamic content delivery is provided.

Whatever the precise merits and features of the prior art in this field, the earlier art does not achieve or fulfill the purposes of the present invention. The prior art does not provide for sharing and linking additional information among multiple calendar events and multiple calendar users; nor does it provide methods for updating and refreshing dynamic information.

SUMMARY OF THE INVENTION

A calendar system stores and organizes materials related to scheduled events, to-dos, addresses, etc. and allows a user to browse a calendar and select entries for viewing. In addition, each entry is linked to any number of topics related to that entry and up-to-date information on these topics are displayed when the entry is viewed. Topics are published on topic channels by one or more topic providers and a calendar system administrator defines which topics relate to which calendar entries. When a client enters information related to a new calendar entry or event, the calendar system determines which topics relate to that event and identifies corresponding topic channels which currently exist, or need to be created, between the calendar system and the topic providers. Finally, in each calendar entry, links are created to local versions of the appropriate topic channels and the entry is then persistently stored. Multiple calendar events and multiple calendar users are able to link to the same local topic channel and thereby reduce data searching, retrieval, and storage costs.

DESCRIPTION OF THE PREFERRED EMBODIMENTS

Figure 1:
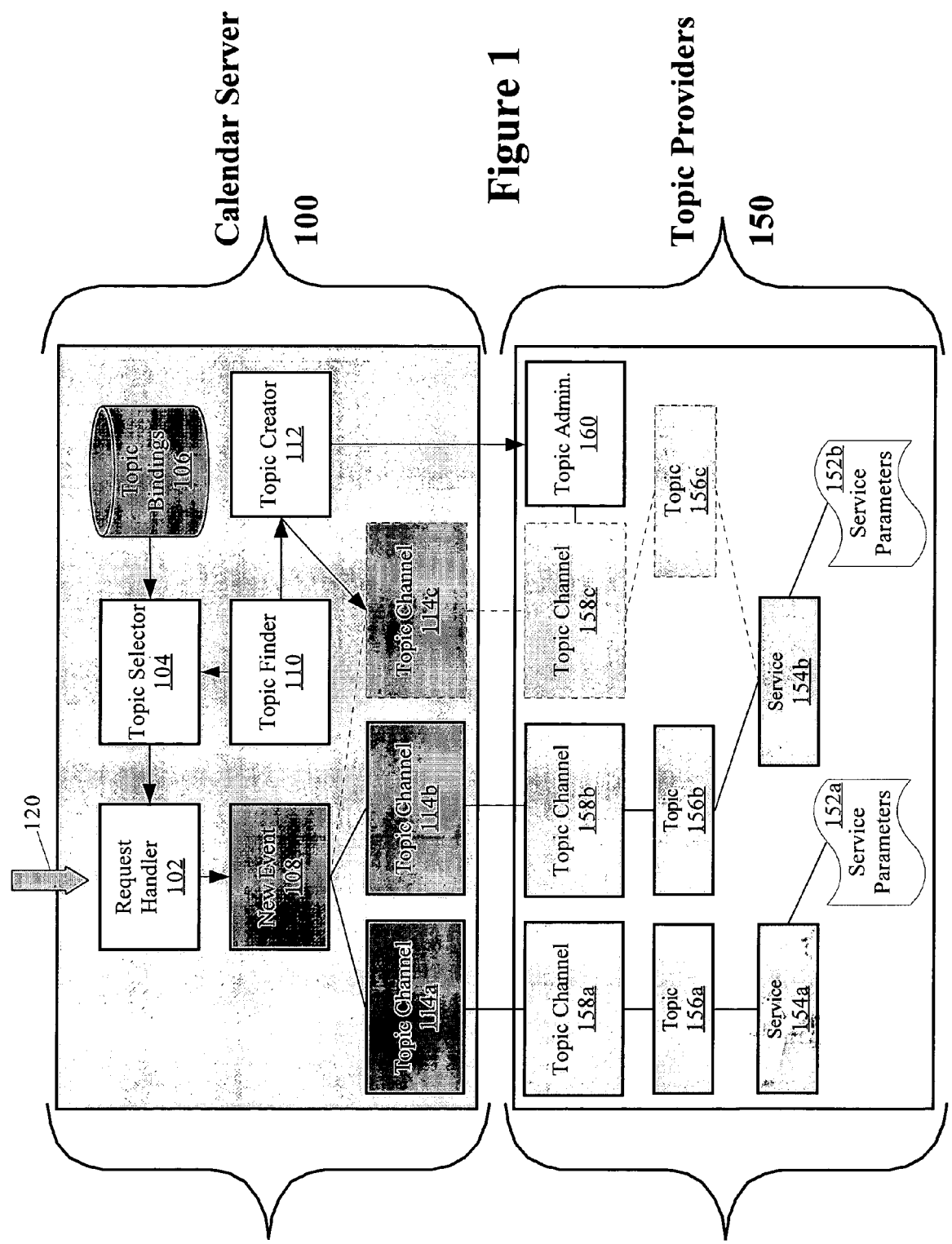
FIG. 1 illustrates the overall architecture of a calendar systems according to the present invention.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

The following definitions may assist in understanding terminology used throughout the present specification:

Service: Services gather information, organize the information into topics and publish the information periodically to update its subscribers. Services are typically distributed across a number of separate servers across multiple networks.

Service Parameters: Service parameters control things such as refresh rates for individual topics, information retrieval control parameters, etc.

Topic: A topic is a node in a topic tree. Topic names are hierarchical. For example, a weather service has two topics "Weather/San Jose" and "Weather/Boston". A subscriber can subscribe to any of these two topics; meaning the subscriber retrieves weather forecasts from both San Jose and Boston. The subscriber can also subscribe to the root topic, "Weather".

Topic Channel: A topic channel is used to pass messages from a topic publisher to a topic subscriber. Sun's™ Java Messaging Service Interface is one standard for setting up publisher/subscriber infrastructures across networks. Microsoft's™ Channel Definition Format (CDF) is a specification regarding how web publishers can offer frequently updated collections of information to interested subscribers.

FIG. 1 depicts the logical components of the present invention along with their interconnections. The principles and operation of the present invention are provided by discussing the flow of information between these logical components. Calendar Server 100 is illustrated as a single entity; however, the present invention also contemplates the logical components of server 100 distributed across networked systems.

Calendar Server 100 handles request 120 from a client (not shown) and, in response, creates new calendar event (or entry, throughout the specification these terms are used interchangeably) 108. In particular, Request Handler 102 receives request 120 for a new event 108 to be scheduled and begins processing it. Request Handler 102 first passes new event 108 to Topic Selector 104.

Topic Selector 104 receives new event 108 and retrieves from Topic Binding Repository 106 all the services which are associated with new event 108. Specifically, Topic Selector 104 extracts relevant information from new event 108 and forwards it to Repository 106 which then maps the event's category (e.g. meeting, travel, vacation etc.) and the event's properties (e.g. departure location, destination, date, etc.) to a number of corresponding services. Repository 106 and its mappings are typically set up by a calendar administrator; however, the present invention also contemplates within its scope custom editing of Repository 106 entries by clients. As an example, when a client schedules a business trip to Boston, Mass. in their calendar, Topic Selector 104 looks in Topic Binding Repository 106 under the business trip category and finds (for example) mapping entries identifying two services: "Weather" and "FlightSchedules". Further, Topic Selector 104 extracts, from new event 108, the destination for this business trip which results in the construction of two topic names: "Weather/MA/Boston" and "FlightSchedules/SJC/Boston". Many additional topic names and services are contemplated within the scope of the present invention.

The list of topic names generated from Topic Binding Repository 106 is passed to Topic Finder 110 which returns a list of Topic Channels 114a,114b and 114c. In particular, Topic Finder 110 takes the list of topic names and, for each name, checks whether there is an existing Topic Channel already set-up. If there is, then this existing Topic Channel is used. If not, then a new Topic Channel must be created for new event 108. To create a new Topic Channel, Topic Finder 110 instructs Topic Creator 112 to create an appropriate, new Topic Channel for new event 108.

Topic Creator 112 receives one or more topic names (e.g. Weather/AZ/Tucson) from Topic Finder 110 and sends a request to an administrator 160 of a remote Topic Provider 150 to create a new Topic 156a, 156b and 156c and Topic Channel 158a, 158b and 158c for a given topic name. Upon successful creation, Topic Creator 112 creates corresponding local Topic Channel(s) 114a, 114b and 114c, which are also linked to remote Topic Channels 158a, 158b and 158c, and returns these channel names to Topic Finder 110. Remote Topic Provider(s) 150 and their administrator(s) 160 control, using known methods, how services 154a and 154b, Topics 156a, 156b and 156c, and Topic Channels 158a, 158b and 158c are internally managed and arranged. While depicted as a homogeneous block in FIG. 1, multiple and distributed Topic Providers 150 are also considered within the scope of the present invention.

Topic Finder 110 receives from Topic Creator 112 a list of topic channels (existing or newly created) corresponding to new event 108 and forwards this list to Topic Selector 104 which then passes the list to Request Handler 102.

Request Handler 102 continues processing new event 108 by adding a link in new event 108 to each Topic Channel 114a, 114b and 114c received from Topic Selector 104. Finally, Request Handler 102 stores new event 108 in a persistent calendar store (not shown) in order to allow retrieval at a later time.

In the event that a client requests deletion of a scheduled event, Request Handler 102 first removes all the links to the event's Topic Channels and then proceeds to erase the event from the persistent calendar store.

Figure 2:
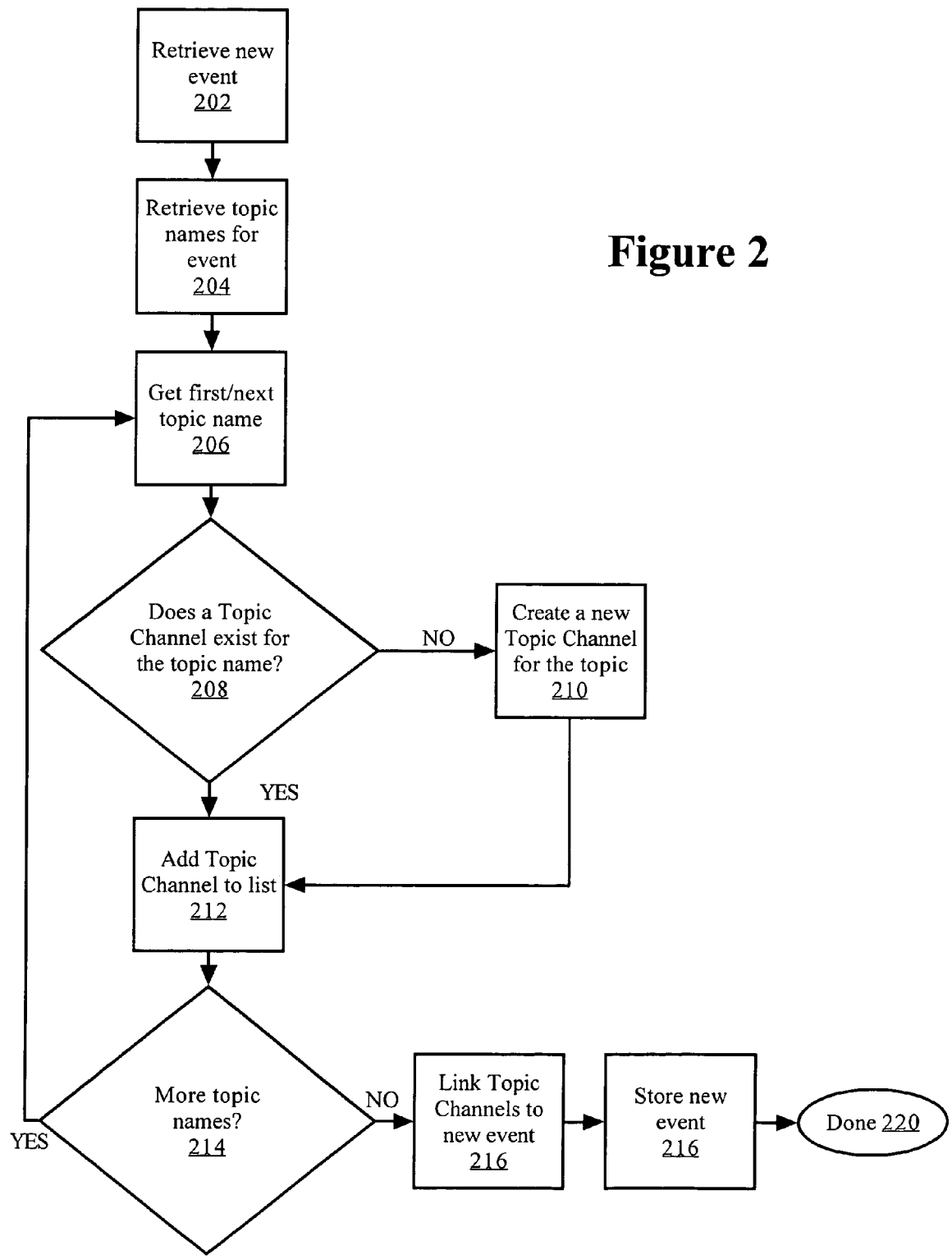
FIG. 2 illustrates a flowchart of a method of linking a topic channel to a new calendar event according to the present invention.

FIG. 2 depicts a flowchart of the logic of creating links to topic channels in new events. This figure focuses on the flow of the logic without explicit references to the components performing the steps.

First, a new event is retrieved in step 202. Next, in step 204, topic names are determined which correspond to this type of event and to the data characterizing this event. These topic names are individually looped through, in step 206, to determine if a corresponding Topic Channel exists (step 208) or needs to be created (step 210). In step 212, a list of corresponding Topic Channels is constructed and step 214 loops back around to ensure all topic names have been analyzed. Processing continues, in step 216, by linking the identified Topic Channels to the new event. After storing the new event in any type of well-known computer storage media, in step 218, processing finishes in step 220.

Figure 3:
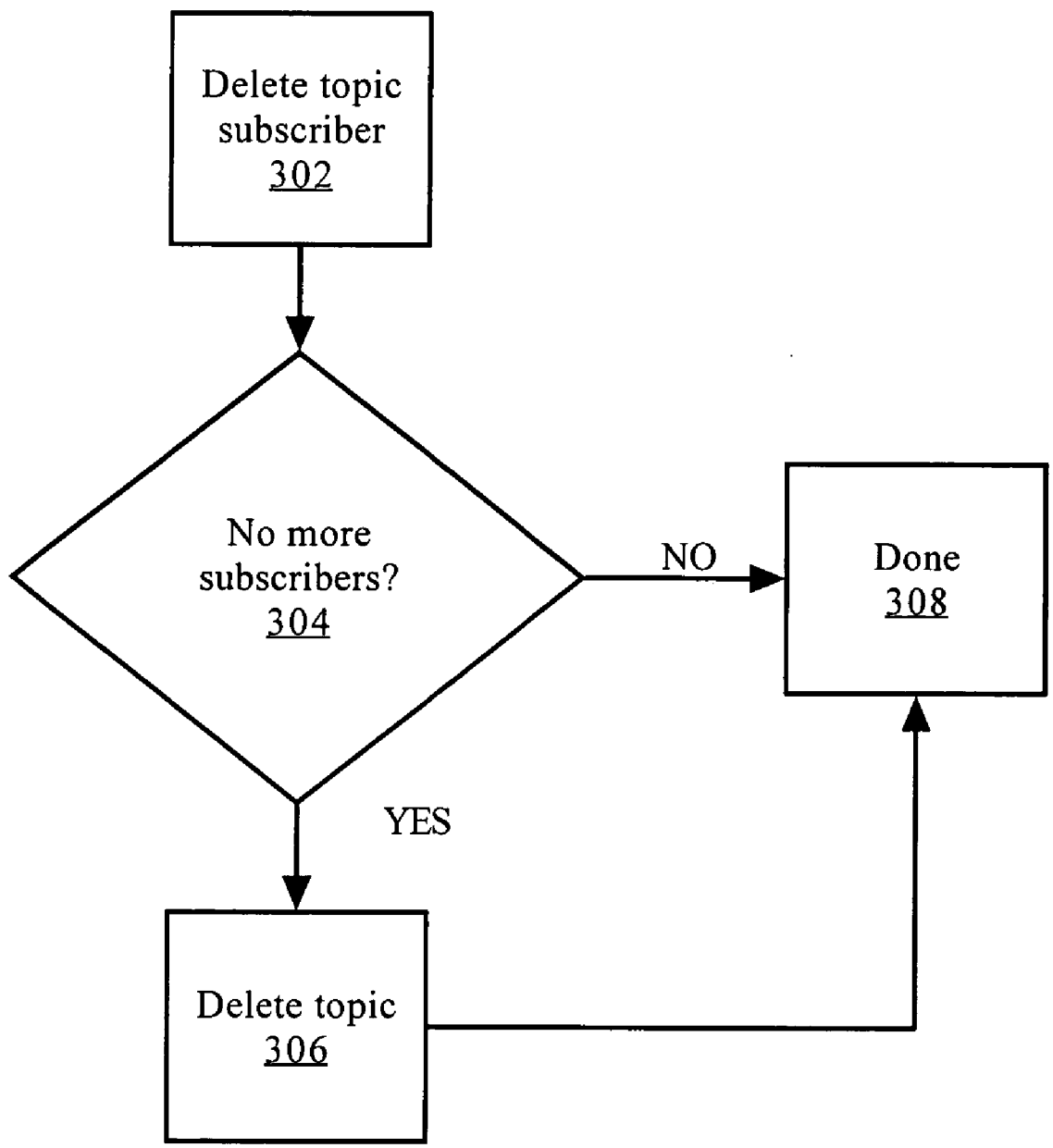
FIG. 3 illustrates a flowchart of a method of removing a topic channel according to the present invention.

FIG. 3 illustrates the logical flow of removing a subscriber from a topic. In step 302, the link from an event to a topic is deleted and step 304 tests whether there are any other links to the particular topic. If there are, then the flow ends in step 308. If there are no other links, however, the topic is deleted in step 306 and then flow completes with step 308.

The present invention allows calendar events to subscribe to specific topics that are relevant to that particular event. Relevant topics include weather forecasts, flight schedules, traffic reports, local news stories and other information. Information is published by an information service and retrieved by one or more information subscribers. Using the infrastructure of the present invention, multiple calendar events are able to share the same information by having each separate event, which relies on similar live information, link to the same local Topic Channel. For example, if two calendar users are traveling to New York on the same day, both events are linked to information retrieved from the New York weather topic and New York local news topic. The present invention relieves the need to repeatedly search, retrieve and store additional information for every single calendar event scheduled. These performance improvements are true for different calendar events belonging to a single user as well as separate calendar events belonging to different users.

CONCLUSION

A system and method has been shown in the above embodiments for the effective implementation of linking electronic calendar events to related, dynamic information by subscribing the events to live information topics. While various preferred embodiments have been shown and described, it will be understood that there is no intent to limit the invention by such disclosure, but rather, it is intended to cover all modifications and alternate constructions falling within the spirit and scope of the invention and as further defined in the appended claims. For example, the present invention should not be limited by calendaring software/ program, computing environment, specific computing hardware, specific information service providers, particular publication/subscription hierarchies, specific enterprise messaging interfaces, particular push-content technologies and specific distributed arrangement of the system's functional components. In addition, the present invention may be implemented on a conventional IBM PC or equivalent, multi-nodal system (e.g. LAN), across extended networks such as the Internet or using portable equipment such as laptop computers or wireless equipment (RF, microwaves, infrared, photonics, etc.).

The invention claimed is:

1. A method of mapping electronic calendar events to at least one topic publisher providing a service comprising the steps of:

receiving a calendar entry for an event associated with a topic subscriber;

identifying a category associated with said calendar entry and at least one service associated with said category;

mapping said event to a set of topic names for said services;

identifying one or more topic channels which are associated with said topic names, said topic channels linked with topic channels remotely provided by said topic publisher;

incorporating, within said event, a link to said one or more topic channels of said event, and receiving frequently updated service messages from said topic publisher for said topic names and topic channels that are associated with said event.

2. A method of mapping electronic calendar events to at least one topic publisher providing a service, as per claim 1, comprising the additional step of parsing said calendar event to identify at least one event category, wherein said at least one event category is used when determining said one or more topic channels.

3. A method of mapping electronic calendar events to at least one topic publisher providing a service, as per claim 1, comprising the additional step of parsing said calendar event to identify at least one event characteristic, wherein said at least one event characteristic is used when determining said one or more topic channels.

4. A method of mapping electronic calendar events to at least one topic publisher providing a service, as per claim 1, wherein said step of incorporating a link further comprises:
for each of said one or more topic channels, performing the steps:
determining if a link to a related service already exists; and
if said link to said service does not exist, creating and opening said link.

5. A method of mapping electronic calendar events to at least one topic publisher providing a service, as per claim 1, wherein said one or more topic channels are provided by a topic publisher providing an information service.

6. A method of mapping electronic calendar events to at least one topic publisher providing a service, as per claim 1, further comprising the step: storing, in a persistent computer storage, said calendar event.

7. A method of mapping electronic calendar events to at least one topic publisher providing a service, as per claim 1, wherein said method is implemented locally or remotely on one or more computer-based systems.

8. A method of mapping electronic calendar events to at least one topic publisher providing a service, as per claim 1, wherein said method is implemented across networks comprising any of LANs, WANs, cellular, Internet, or Web-based networks.

9. A method of mapping electronic calendar events to at least one topic publisher providing a service, as per claim 1, wherein said step of identifying one or more topic channels further comprises the step wherein if no topic channels are identified for a specific topic name, creating a new topic channel corresponding to said specific topic name, wherein said new topic channel links said calendar entry with a corresponding topic channel remotely provided by a topic publisher.

10. A method of creating topic channels for linking calendar events to service messages from a topic publisher comprising the steps:
receiving a calendar entry for an event associated with a topic subscriber;
determining a set of topic names for at least one service associated with said calendar entry;
for each particular topic name in said set of topic names, performing the following steps:
determining if a corresponding topic channel exists for said particular topic name, said topic channels linked with topic channels remotely provided by said topic publisher;
if said topic channel does not exist, then creating a corresponding topic channel; and
adding said corresponding topic channel to a set of topic channels;
for each topic channel in said set of topic channels, creating a link in said calendar event to said topic channel, and
receiving frequently updated service messages from said topic publisher for said topic names and topic channels that are associated with said event.

11. A method of linking calendar events to service messages from a topic publisher, as per claim 10, wherein said step of determining a set of topic names further comprises the steps:
extracting from said calendar event one or more event descriptors, and
determining, based on said one or more event descriptors, said set of topic names.

12. A method of linking calendar events to service messages from a topic publisher, as per claim 11, wherein said one or more event descriptors are event categories.

13. A method of linking calendar events to service messages from a topic publisher, as per claim 11, wherein said one or more event descriptors are event characteristics.

14. A method of linking calendar events to service messages from a topic publisher, as per claim 10, wherein said method is implemented across networks comprising any of LANs, WANs, cellular, Internet, or Web-based networks.

15. A method of linking calendar events to service messages from a topic publisher, as per claim 10, wherein said method is implemented locally or remotely on one or more computer-based systems.

16. A subscription system for mapping a topic subscriber creating electronic calendar events to a topic publisher, said system comprising:
a calendar server handling request for a new calendar entry said server comprising:
a request handler receiving a request for said calendar entry for an event associated with a topic subscriber to be scheduled;
a topic selector identifying a category associated with said calendar entry and at least one service associated with said category;
a topic binding repository mapping said calendar event to a set of topic names for said services;
a topic finder, determining the existence of a set of topic channels provided by said topic publisher, wherein said channels correspond to said topic names received from said repository, and said topic finder further identifying at least a first and second subset of said set of topic channels;
said first subset populated by topic channels which currently exist within said calendar system;
said second subset populated by topic channels which currently do not exist within said calendar system;
a topic creator, creating within the calendar system a set of new topic channels corresponding to each element of said second subset, said topic creator then returning said new channels to said topic finder in order to establish a subscription for frequently updated collections of information to be forwarded to a topic selector, said topic selector retrieving said topic names and topic channels associated with said calendar event as established by said topic finder, and wherein said request handler processes said calendar event by adding a link in said calendar event to each associated topic channel received from said topic selector, said topic channel passing messages from a topic publisher to a topic subscriber, and frequently updating service messages from said topic publisher for said topic names and tonic channels associated with said event.

17. A subscription system for mapping a topic subscriber creating electronic calendar events to a topic publisher, as per claim 16, wherein said repository also extracts at least one event category for said calendar event which said repository uses to determine said list of topic names.

18. A subscription system for mapping a topic subscriber creating electronic calendar events to a topic publisher, as per claim 16, wherein said repository also extracts at least one event characteristic for said calendar event which said repository uses to determine said list of topic names.

19. An article of manufacture comprising a computer user medium having a computer readable program code embodied therein which implements mapping calendar events to service messages from topic providers, said subscribing comprising the steps:

receiving a calendar entry for an event associated with a topic subscriber;

identifying a category associated with said calendar entry and at least one service associated with said category;

mapping said calendar event to a set of topic names for said services;

determining the existence of one or more topic channels, provided by said topic publisher, which are associated with said topic names;

opening at least one subscription for said service, each of said at least one subscription corresponding to one of said one or more topic channels of said event, incorporating, within said calendar event, a link to each of said at least one subscription, and receiving frequently updated service messages from said topic publisher for said topic names and topic channels that are associated with said calendar event.

* * * * *